(12) United States Patent
Sasaki

(10) Patent No.: US 7,633,211 B2
(45) Date of Patent: Dec. 15, 2009

(54) ACTUATOR

(75) Inventor: Ryota Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 34 days.

(21) Appl. No.: 11/501,888

(22) Filed: Aug. 10, 2006

(65) Prior Publication Data
US 2007/0035210 A1    Feb. 15, 2007

(30) Foreign Application Priority Data
Aug. 12, 2005  (JP)  ............ P2005-234639

(51) Int. Cl.
H01L 41/053 (2006.01)
H02N 2/04 (2006.01)

(52) U.S. Cl. .................. 310/328; 310/329

(58) Field of Classification Search ............ 310/328, 310/345, 348, 312, 327, 329
See application file for complete search history.

(56) References Cited

U.S. PATENT DOCUMENTS 7,221,077 B2 *  5/2007  Sawada ............. 310/369

2002/0030422 A1 *  3/2002  Hata ............ 310/323.17
2002/0084719 A1     7/2002  Okamoto et al.
2004/0007941 A1     1/2004  Yuasa et al.
2006/0238074 A1 * 10/2006  Manabe ............ 310/328

FOREIGN PATENT DOCUMENTS

| EP | 0 464 764 A1 | 1/1992 |
| JP | 6-123830 A | 5/1994 |
| JP | 8-207756 A | 8/1996 |
| JP | 3171187 B2 | 3/2001 |
| JP | 2002-142470 A | 5/2002 |

* cited by examiner

Primary Examiner—Walter Benson
Assistant Examiner—Derek J Rosenau
(74) Attorney, Agent, or Firm—Birch, Stewart, Kolasch & Birch, LLP (57) ABSTRACT

An actuator comprises: an electro-mechanical conversion element; a driving frictional member mounted onto one side in an extension/contraction direction of the electro-mechanical conversion element; a driven member frictionally engaged with the driving frictional member; and a weight member affixed to the other side in the extension/contraction direction of the electro-mechanical conversion element and extending along sides of the electro-mechanical conversion element.

7 Claims, 9 Drawing Sheets

ACTUATOR

BACKGROUND OF THE INVENTION

1. Field of the Invention

The present invention relates to an actuator, and particularly relates to an actuator that is installed in a digital camera, mobile phone, or other compact precision apparatus and drives a zoom lens and a focusing lens.

2. Description of the Related Art

As a driving device for a lens unit of a digital camera, etc., an actuator that employs a piezoelectric element is used. For example, an actuator of JP-A-2002-142470 is arranged from a piezoelectric element, a driving member, and a pedestal. The driving member is affixed to one end face along an extension/contraction direction of the piezoelectric element, and a drive member is frictionally engaged with this driving member. The pedestal is affixed to the other end face along the extension/contraction direction of the piezoelectric element. This pedestal functions as a weight member that is an inertial body, and with this arrangement, pulse-form voltages are applied to the piezoelectric element and movements of the piezoelectric element in an extension direction and a contraction direction are transmitted by the inertial action of the pedestal to the driving member. When the piezoelectric element deforms at a low speed, the driven member moves along with the driving member, and when the piezoelectric element deforms at a high speed, the driven member stays at the same position due to its mass inertia. Thus, by repeatedly applying pulse-form voltages, the driven member can be moved intermittently at a fine pitch.

With the actuator arranged as described above, there is an issue that resonance occurs among the pedestal, the piezoelectric element, and the driving member. With the actuator of JP-A-2002-142470, to prevent the effects of resonance when the actuator is mounted onto a main body, the pedestal is affixed to the main body by a rubber-based adhesive agent to elastically support the actuator on the main body. However, with such a drive system, scattering of the arrangement of the pedestal, the piezoelectric element, and the driving member becomes extremely difficult to control.

When such resonance is made use of, the merit of increased moving amount of the driving member is provided. For example, an actuator that makes use of this resonance is described in Japanese Patent No. 3171187. With this actuator, by applying pulse-form voltages in accordance to the displacement of the piezoelectric element during resonance, the displacement amount of the driven member is made large.

However, with the actuators of JP-A-2002-142470 and Japanese Patent No. 3171187, when the weight of the pedestal that functions as a weight member is small, even when the resonance is made use of, the moving distance, moving speed, and thrust of the driven member is inadequate. Although a pedestal of large weight is thus required, this makes the device large. In particular, in a case where a zoom lens or other driven member of large moving distance is to be moved, a pedestal of extremely large weight is required and the device becomes large.

Figure 5A:
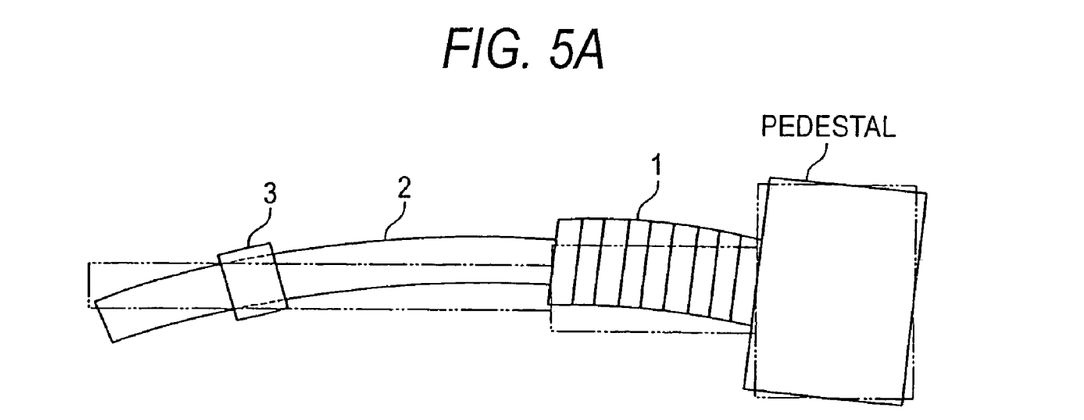
FIGS. 5A and 5B are explanatory diagrams for explaining a problem of the related-art actuator.
Figure 5B:
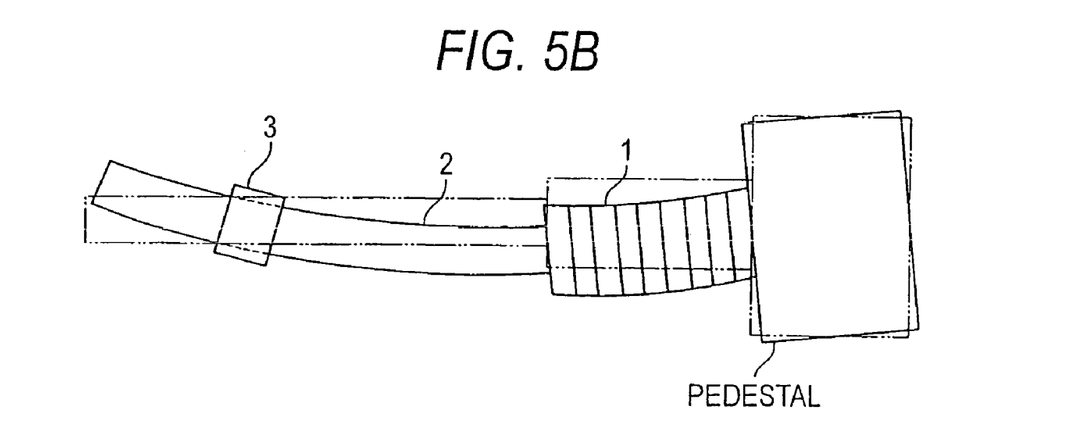

Also, with the actuators of JP-A-2002-142470 and Japanese Patent No. 3171187, because the resonance state, which arises in the actuator arranged from the piezoelectric element, the driving member, and the pedestal, is made use of, the inadvertent effects of the resonance are applied and the driven member becomes displaced in directions besides the extension/contraction direction of the piezoelectric element. For example, a driving member 2 receives the influence of the resonance and becomes displaced in directions besides the extension/contraction direction of a piezoelectric element as shown in FIGS. 5A and 5B. The driving force due to extension/contraction of the piezoelectric element 1 is thus not accurately transmitted to a driven member 3, and the driven member 3 cannot be moved accurately in the extension/contraction direction of the piezoelectric element 1.

SUMMARY OF THE INVENTION

The present invention has been made in view of these circumstances, and an object thereof is to provide an actuator that can perform stable drive control and yet can be made compact.

In order to achieve the above object, according to a first aspect of the invention, there is provided an actuator comprising: an electro-mechanical conversion element; a driving frictional member mounted onto one side in an extension/contraction direction of the electro-mechanical conversion element; a driven member frictionally engaged with the driving frictional member; and a weight member affixed to the other side in the extension/contraction direction of the electro-mechanical conversion element and extending along sides of the electro-mechanical conversion element.

With the first aspect of the invention, because the weight member extends along the sides of the electro-mechanical conversion element, even if the weight member is made large, the actuator does not become large in the driving direction. Thus, with the first aspect of the invention, the weight member can be made large to improve the moving distance, moving speed, and thrust of the driven member and yet a compact actuator can be obtained. With the present invention, "sides of the electro-mechanical conversion element" refers to side faces besides those in the displacement direction.

A second aspect of the invention provides the actuator according to the first aspect of the invention, wherein the weight member is an elastic body that contains a metal powder. The weight member of the second aspect of the invention is thus adequately heavy in specific gravity, provides an elastic force, and can thus prevent resonance of the device arrangement system.

A third aspect of the invention provides the actuator according to the second aspect of the invention, wherein the elastic body is urethane rubber.

A fourth aspect of the invention provides the actuator according to any one of the first to third aspects of the invention, wherein the weight member is formed to a square C-shape. With the weight member that is formed thus, when the weight member is affixed onto the electro-mechanical conversion element by an adhesive agent, the peeling of the adhesive agent can be prevented.

A fifth aspect of the invention provides the actuator according to any one of the first to fourth aspects of the invention, wherein the weight member is mounted onto the electro-mechanical conversion element by an adhesive agent.

A sixth aspect of the invention provides the actuator according to any one of the first to fifth aspects of the invention, wherein a holding frame of a zoom lens is mounted onto the driven member.

DETAILED DESCRIPTION OF THE INVENTION

Figures 1, 2A:
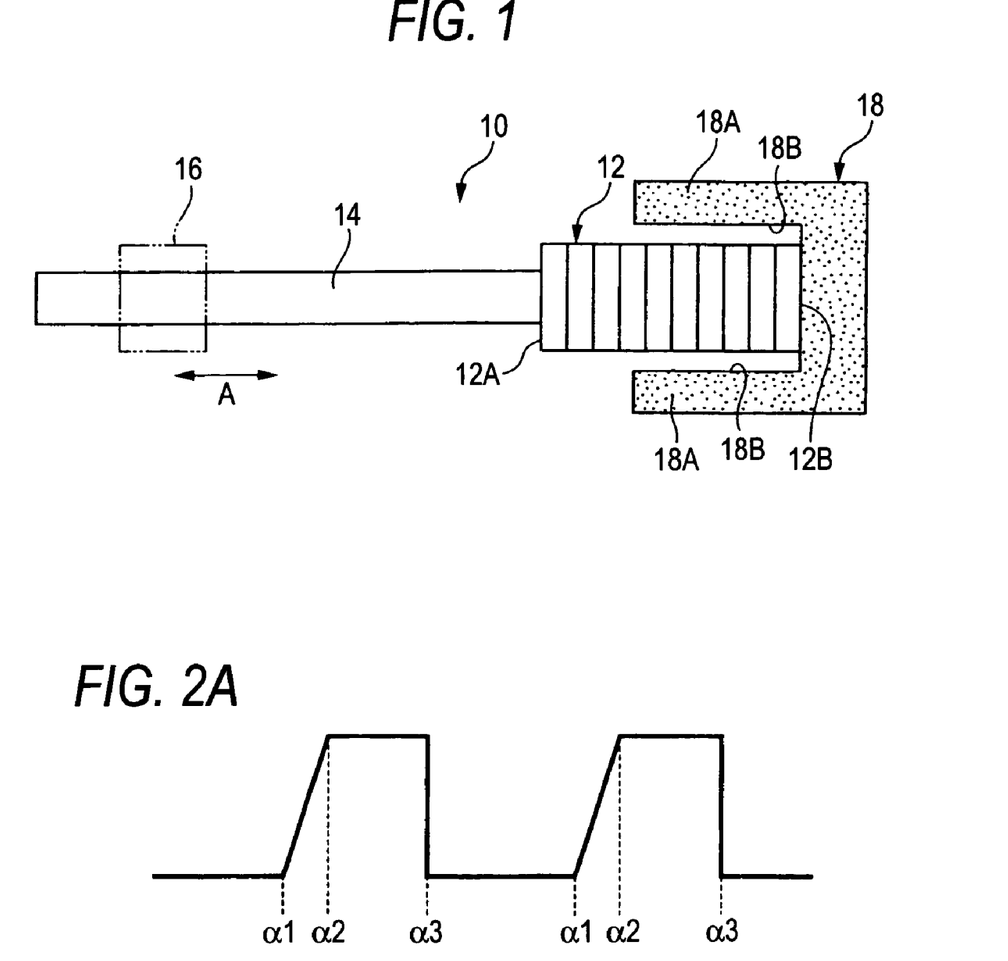
FIG. 1 is a plan view of an actuator according to the present invention.
FIGS. 2A and 2B are waveform diagrams of drive pulses applied to a piezoelectric element.

Preferred embodiments of an actuator according to the present invention shall now be described in detail with reference to the attached drawings. FIG. 1 is a basic arrangement diagram that illustrates principles of an actuator according to the present invention.

As shown in FIG. 1, the actuator 10 is arranged from a piezoelectric element (corresponding to being an electromechanical conversion element) 12, a driving shaft (corresponding to being a driving frictional member) 14, a driven member 16, and a weight member 18. The piezoelectric element 12 is layered in the direction of the arrows and is arranged to deform (extend or contract) in a driving direction upon application of voltage. Thus, with the piezoelectric element 12, end faces 12A and 12B in the longitudinal direction become displaced.

Of the end faces 12A and 12B of the piezoelectric element 12, a base end of the driving shaft 14 is affixed to one end face 12A. The driving shaft 14 is formed, for example, to a cylindrical shape and is positioned so that its axis lies along the direction of the arrows (that is, the extension/contraction direction of the piezoelectric element). As the material of the driving shaft 14, a graphite crystal composite, such as carbon graphite, in which graphite crystals are compounded firmly, is used. The shape of the driving shaft 14 is not restricted to a cylinder and may be a rectangular column instead.

The driven member 16 is engaged with the driving shaft 14 with a predetermined frictional force and is supported in a manner enabling sliding along the driving shaft 14. The frictional force between the driven member 16 and the driving shaft 14 is set so that when drive pulses of a gradual voltage variation is applied to the piezoelectric element 12, the static frictional force is greater than the driving force, and when drive pulses of a rapid voltage variation is applied to the piezoelectric element 12, the static frictional force is less than the driving force.

The weight member 18 is affixed to the end face 12B of the piezoelectric element 12. By applying a load to the end face 12B, the weight member 18 prevents the end face 12B from becoming displaced more than the end face 12A, and thus as the weight member 18, a member that is greater in weight than the driving shaft 14 is preferable. For example, if the driving shaft 14 is 8 mg and the piezoelectric element 12 is 32 mg, a weight member 18 of 32 mg is used.

Also, the weight member 18 is formed of a soft material. As the material of the weight member 18, a material with a Young's modulus less than that of each of the piezoelectric element 12 and the driving shaft 14 is used. The Young's modulus of the weight member 18 is preferably no more than 1 GPa and more preferably no more than 300 MPa. Such a weight member 18 is formed by mixing a metal powder of large specific gravity into rubber or other elastic body, and is manufactured, for example, by mixing a tungsten powder into urethane rubber or urethane resin. To achieve compact size, the specific gravity of the weight member 18 is preferably made as high as possible and is set, for example, to approximately 8 to 12.

Furthermore, the weight member 18 is formed to a square C-shape and the end face 12B of the piezoelectric element 12 is affixed to a bottom portion of an inner side thereof. That is, the weight member 18 is affixed to the end face 12B and extends along sides of the piezoelectric element 12. The two portions 18A that protrude along the sides are formed to be of the same shape and same weight. The weight member 18 is preferably formed to be uniform in density.

Figure 2B:
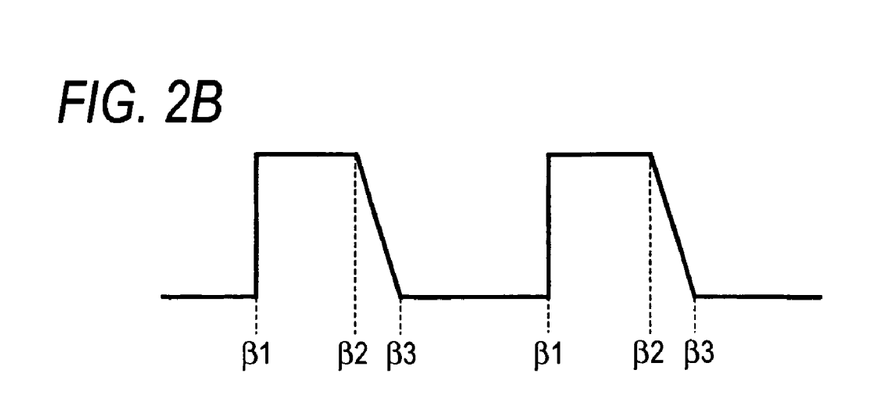

The piezoelectric element 12 is electrically connected to an unillustrated drive pulse supplying device, and by this drive pulse supplying device, voltages of the waveforms shown in FIGS. 2A and 2B are applied.

FIGS. 2A and 2B illustrate an example of pulse waveforms that are applied to the piezoelectric element 12. FIG. 2A shows the drive pulses for moving the driven member 16 of FIG. 1 in the left arrow direction, and FIG. 2B shows the drive pulses for moving the driven member 16 of FIG. 1 in the right arrow direction.

In the case of FIG. 2A, substantially sawtooth-like drive pulses, each of which rises gradually from a time $\alpha 1$ to a time $\alpha 2$ and drops rapidly at a time $\alpha 3$, are applied to the piezoelectric element 12. Thus, from the time $\alpha 1$ to the time $\alpha 2$, the piezoelectric element 12 extends gradually. Because, in this process, the driving shaft 14 moves at a gradual speed, the driven member 16 moves along with the driving shaft 14. The driven member 16 can there by be moved in the left direction of FIG. 1. At the time $\alpha 3$, because the piezoelectric element 12 contracts rapidly, the driving shaft 14 moves in the right direction of FIG. 1. Because, in this process, the driving shaft 14 moves rapidly, the driven member 16 remains stopped at the same position due to inertia and just the driving shaft 14 moves. Thus, by applying the sawtooth drive pulses shown in FIG. 2A repeatedly, the driven member 16 of FIG. 1 is made to repeat movement in the left direction and stoppage, and can thus be moved in the left direction.

In the case of FIG. 2B, substantially sawtooth-like drive pulses, each of which rises rapidly at a time $\beta 1$ and drops gradually from a time $\beta 2$ to a time $\beta 3$, are applied to the piezoelectric element 12. Thus, at the time $\beta 1$, the piezoelectric element 12 extends rapidly, and the drive shaft 14 moves in the left direction of FIG. 1. Because, in this process, the driving shaft 14 moves rapidly, the driven member 16 remains stopped at the same position due to inertia and just the driving shaft 14 moves. From the time $\beta 2$ to the time $\beta 3$, the piezoelectric element 12 contracts gradually. Because, in this process, the driving shaft 14 is displaced gradually, the driven member 16 moves along with the driving shaft 14. The driven member 16 can thereby be moved in the right direction of FIG. 1. Thus, by applying the sawtooth-like drive pulses shown in FIG. 2B repeatedly, the driven member 16 of FIG. 1 is made to repeat movement in the right direction and stoppage, and can thus be moved in the right direction.

The actions of the actuator 10 arranged as described above shall now be described.

With the actuator 10 according to the embodiment, the weight member 18 is shaped to a square C-shape and extends along the sides of the piezoelectric element 12. By thus making the weight member 18 extend along the sides of the piezoelectric element 12, when the weight member 18 is made large, it can be prevented from becoming large in the driving direction of the actuator 10. Because the longitudinal direction of the driving shaft 14 is the driving direction, the actuator 10 has a shape that is long in the driving direction. Thus, when, as in the related-art case (for example, as shown in FIGS. 5A and 5B), a large weight member is mounted onto the end face 12B of the piezoelectric element 12, the actuator becomes large in the driving direction and becomes difficult to install in a mobile phone or other compact apparatus. On the other hand, because the weight member 18 extends along the sides of the piezoelectric element 12, the actuator 10 of the present embodiment can be made compact in the driving direction even when the weight member 18 is made large.

Also, with the present embodiment, because the weight member 18 extends along the sides of the piezoelectric element 12, when the piezoelectric element 12 and the weight member 18 are adhered together by an adhesive agent, the mechanical strength is large. That is, when the end face 12B of the piezoelectric element 12 and the weight member 18 are adhered, because a periphery (the portion of 18B in FIG. 1) of the bottom face of the weight member 18 is filled with the adhesive agent, the adhesive agent that adheres the piezoelectric element 12 and the weight member 18 together does not peel readily and the mechanical strength of the actuator 10 can be improved.

Also, with the actuator 10 according to the embodiment, the weight member 18 is formed of a soft material of low Young's modulus. By using such a weight member 18, a resonance frequency $f_0$ of an equivalent single-degree-of-freedom system having the piezoelectric element 12 and the driving shaft 14 as a mass and the weight member 18 as an elastic body can be lowered significantly. This is clear from the following equation for determining the resonance frequency $f_0$. In this equation, E is the Young's modulus of the weight member 18, A is the area of the piezoelectric element 12 side of the weight member 18, h is the thickness of the weight member 18, Ma is the mass of the piezoelectric element 12, Mb is the mass of the driving shaft 14, and Mc is the mass of the weight member 18.

$$f_0 = \frac{1}{2\pi}\sqrt{\frac{EA}{\left(Ma + Mb + \frac{1}{3}Mc\right)h}}$$ [Mathematical Equation 1]

As is clear from this equation, when the Young's modulus E of the weight member 18 is made small, the resonance frequency $f_0$ of the equivalent single-degree-of-freedom system becomes small. In the present embodiment, by making the Young's modulus of the weight member 18 no more than 300 MPa, the resonance frequency $f_0$ can be set to 5 to 30 kHz.

On the other hand, with the related-art device, because the member corresponding to being the weight member is formed of a hard material of large Young's modulus, the resonance frequency $f_0$ is high and is approximately 80 kHz. Thus, in order to use the resonance to increase the driving force, the driving frequency must be set accurately in a range of 50 to 100 kHz near the resonance frequency. However, in installing the actuator onto a device, because the actuator must be supported by the main body side at some position and the resonance frequency varies accordingly, it is extremely difficult to eliminate the effects of the resonance. Thus, with the related-art device, vibration in directions besides the extension/contraction direction of the piezoelectric element 12 occurs as shown in FIGS. 5A and 5B and the driven member 16 does not move accurately.

Figure 4:
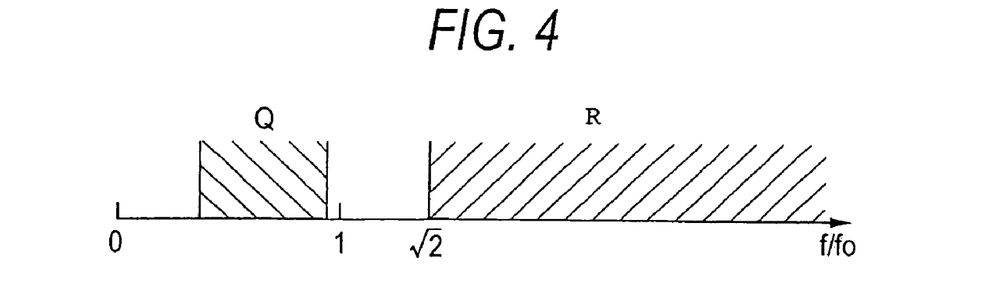
FIG. 4 is a diagram for explaining a relationship of a driving frequency range with respect to a resonance frequency.

As described above, because with the actuator 10 of the present embodiment, the weight member 18 is formed of a soft material, the resonance frequency $f_0$ of the equivalent single-degree-of-freedom system can be lowered to 5 to 30 kHz. The normally used driving frequency f of 50 to 100 kHz thus satisfies $f \geq 2^{1/2} \cdot f_0$. The range in which $f \geq 2^{1/2} \cdot f_0$ is satisfied (that is, the range R of FIG. 4) is a vibration-proof region, in which a rate of transmission of force between a supporting member (for example, a fixed frame 30 of FIG. 8) of the actuator 10 and the piezoelectric element 12 is no more than 1, and the influence of resonance is extremely small. Thus, with the present embodiment, by forming the weight member 18 from a soft material, the driving member 14 can be prevented from vibrating in directions besides the extension/contraction direction of the piezoelectric element 12 due to resonance. Because the driving member 14 is thus displaced in the extension/contraction direction of the piezoelectric element 12, the driving force due to extension/contraction of the piezoelectric element 12 is transmitted accurately to the driven member 16, and the driven member 16 can be driven and controlled accurately in the extension/contraction direction of the piezoelectric element 12. With the present embodiment, while the driven member 16 can be driven accurately in the extension/contraction direction of the piezoelectric element 12, the moving amount of the driven member 16 decreases in comparison to the case where use is made of the resonance to move the driven member. However, by increasing the number of laminated layers of the piezoelectric element 12, the moving amount of the driven member 16 can be increased.

Also, with the present embodiment, by lowering the resonance frequency $f_0$, the driving frequency f of the actuator 10 can be set within the wide range of $f \geq 2^{1/2} \cdot f_0$. Thus, even if the resonance frequency $f_0$ varies due to temperature change and other environmental loads and scattering among products, etc., the setting of the driving frequency f does not need to be changed and the setting does not have to be changed according to each actuator 10.

Also, with the present embodiment, because by the use of the soft weight member 18, the resonance frequency $f_0$ is lowered significantly, the relationship, $f \geq 2^{1/2} \cdot f_0$, is satisfied even when the driving frequency f is in a low range (Q). Use can thus be made with the driving frequency f being in a low range (Q) and the consumption power can be reduced in comparison to cases where use is made with the driving frequency f being in a high range (R).

Figure 3A:
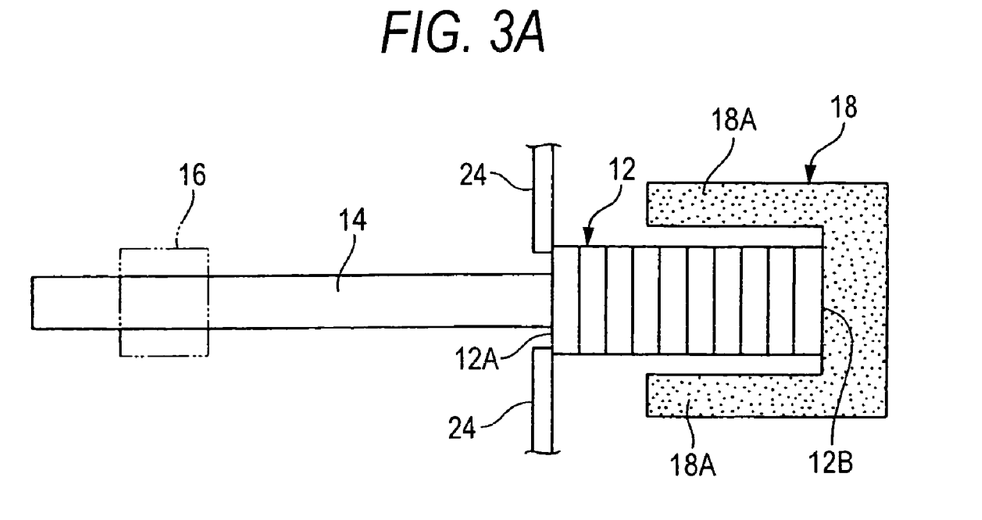
FIGS. 3A and 3B are schematic diagrams of a supporting position of the actuator of FIG. 1.
Figure 3B:
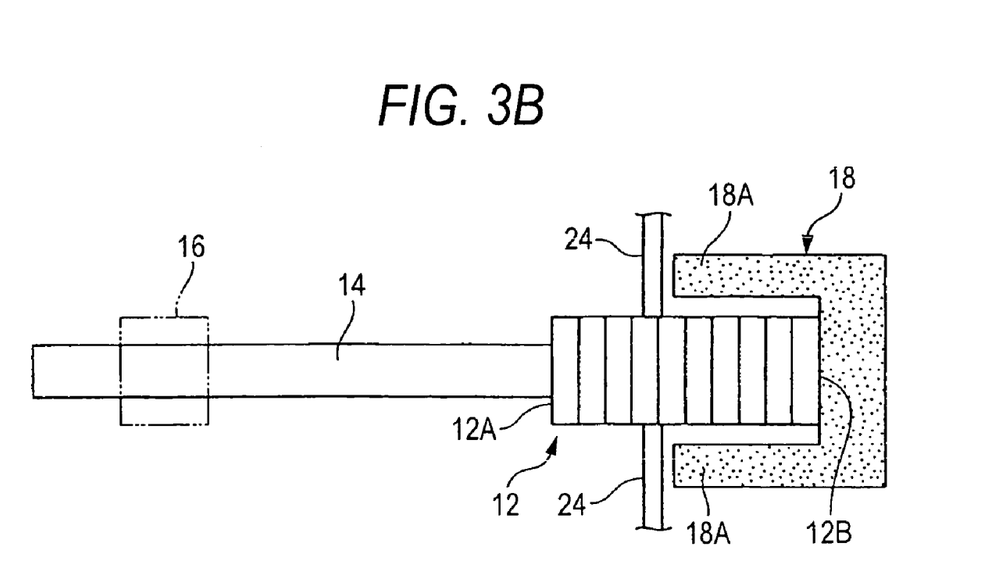

Furthermore, with the present embodiment, because the resonance frequency $f_0$ of the system arranged from the piezoelectric element 12, the driving shaft 14, and the weight member 16 can be lowered in itself to eliminate inadvertent effects due to resonance, the driven member 16 can be moved accurately in the extension/contraction direction of the piezoelectric element 12 regardless of the position or method of support of the actuator 10. Thus, the end face 12A of the piezoelectric element 12 can be supported by supporting members 24 as shown in FIG. 3A, or side faces of the piezoelectric element 12 can be supported by the supporting members 24 as shown in FIG. 3B. Furthermore, a front end face or side faces of the driving shaft 14 or side faces or a rear end face of the weight member 18 may be supported. No matter how the support is realized, by forming the weight member 18 from a soft material, the vibration of the driving shaft 14 in directions besides the extension/contraction direction of the piezoelectric element 12 due to the effects of the resonance that occurs inside the actuator 10 can be prevented and the driven member 16 can be moved accurately in the extension/contraction direction of the piezoelectric element 12.

Figure 6:
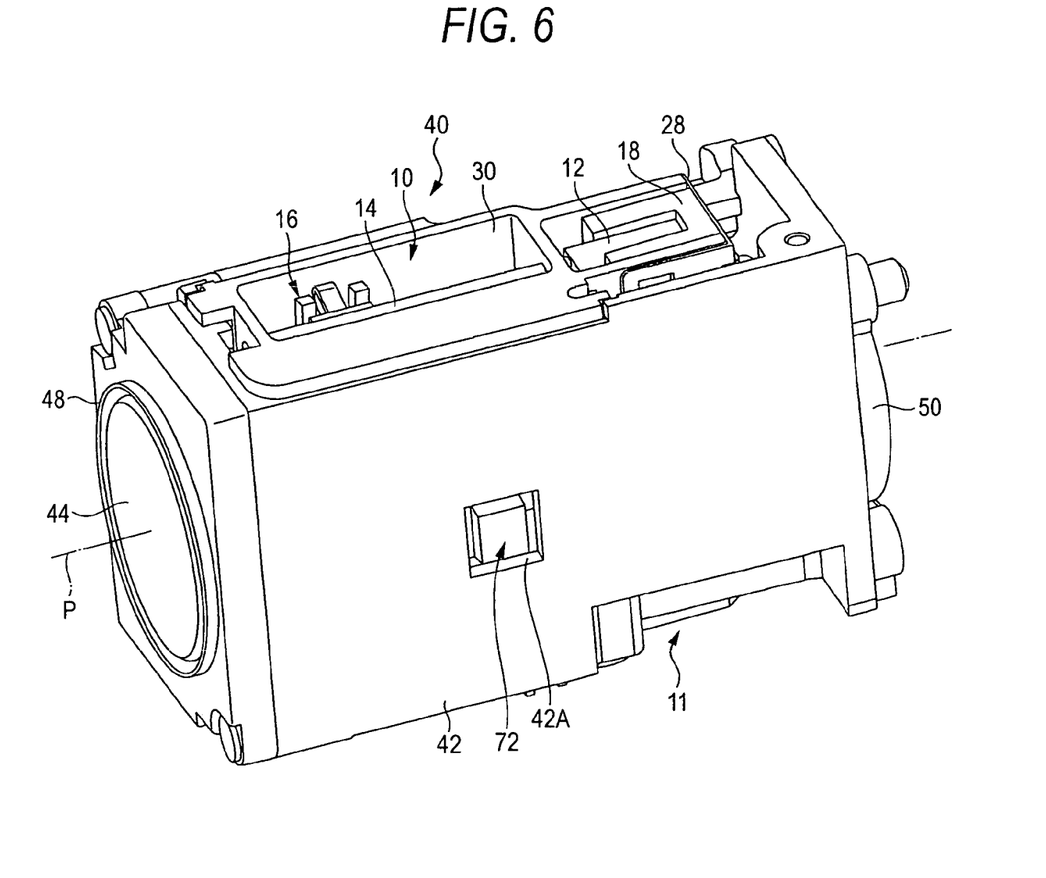
FIG. 6 is a perspective view of a lens device to which an actuator according to the present invention is applied.
Figure 7:
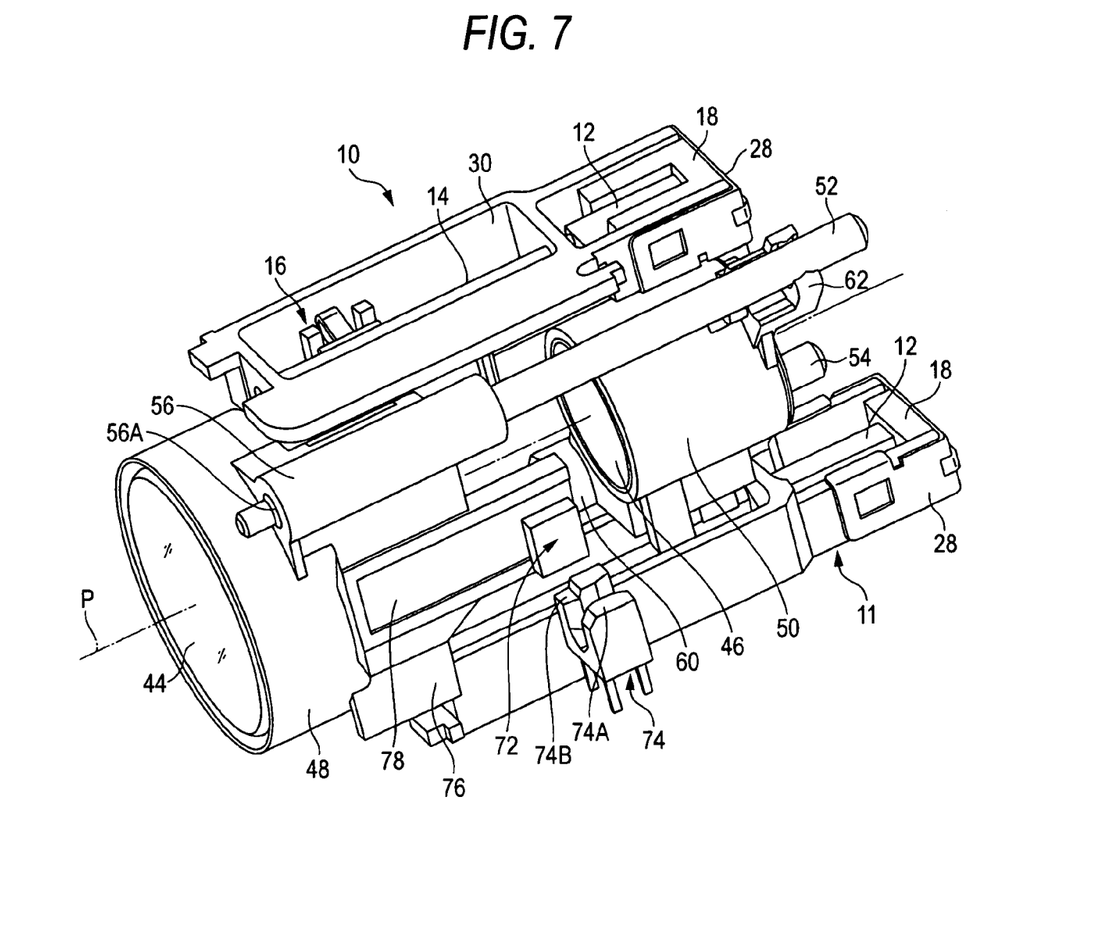
FIG. 7 is a perspective view of an internal arrangement of the lens device of FIG. 6.
Figure 8:
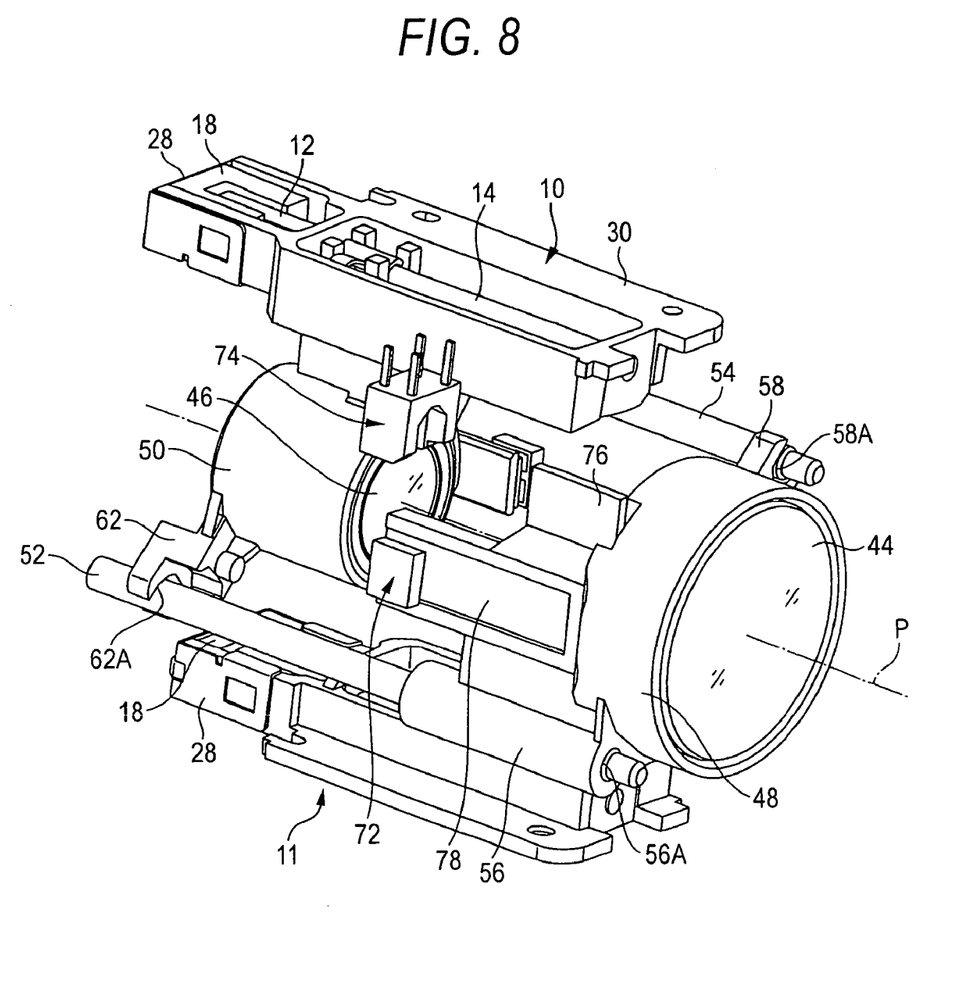
FIG. 8 is a perspective view of the lens device as viewed from a different direction as FIG. 7.

FIG. 6 shows an embodiment of installing the actuator 10 according to the present invention in a mobile phone with camera and shows a lens device 40 to which the actuator 10 is applied. FIG. 7 and FIG. 8 are perspective views of an internal arrangement of the lens device.

As shown in FIG. 6, the lens device 40 has a main body 42, and has zoom lenses (groups) 44 and 46 in the interior of the main body 42 as shown in FIG. 7 and FIG. 8. Of the zoom lenses (groups) 44 and 46, one is a variator lens and the other is a compensator lens. The zoom lenses (groups) 44 and 46 are respectively held in holding frames 48 and 50, and these holding frames 48 and 50 are supported by two guide shafts 52 and 54 in a manner enabling sliding along an optical axis P direction. The two guide shafts 52 and 54 are disposed in parallel to the optical axis P at diagonal positions inside the main body 42 and are fixed to the main body 42.

The holding frame 48 has a guide portion 56, having an insertion hole 56A through which the guide shaft 52 is inserted, and an engaging portion 58, having a U-shaped groove 58A that is engaged with the guide shaft 54. The holding frame 58 is thereby guided by the two guide shafts 52 and 54, and the zoom lens (group) 44 is supported in a manner enabling movement in the optical axis P direction. Likewise, the holding frame 50 of the zoom lens 56 has a guide portion 60, having an insertion hole (not shown) through which the guide shaft 54 is inserted, and an engaging portion 62, having a U-shaped groove 62A, with which the guide shaft 52 is engaged. The holding frame 50 is thereby guided by the two guide shafts 52 and 54, and the zoom lens (group) 46 is supported in a manner enabling movement in the optical axis P direction.

The zoom lenses (groups) 44 and 46 are driven in the optical axis P direction by means of the actuators 10 and 11, respectively. The actuators 10 and 11 are disposed at opposite faces of the main body 42. Specifically, the actuator 10 for the zoom lens (group) 44 is disposed on an upper face of the main body 42 in FIG. 6, and the actuator 11 for the zoom lens (group) 46 is disposed on a lower face of the main body 42. Although a description of the actuator 10 shall be provided below, the actuator 11 is arranged in the same manner.

Symbols 72 and 74 in FIG. 6 to FIG. 8 indicate position detectors that detect positions of the holding frame 48 and the holding frame 50. The position detector 72 is a reflection type photointerrupter that is disposed opposite a plate-like reflecting portion 78, formed integral to the holding frame 48 (or the holding frame 50), and is fitted and fixed in an opening 42A of the main body 42 (see FIG. 6). On the reflecting portion 78, a plurality of reflecting bodies (not shown) are disposed at fixed intervals along the driving direction. Light is thus projected from the position detector 72 to the reflecting portion 78, and by receiving the reflected light and detecting the variation of the light amount, the movement amount of the reflecting portion 78 (that is, the holding frame 48 or 50) can be detected. Meanwhile, the position detector 74 has a light projecting portion 74A and a light receiving portion 74B, and a plate-like light blocking portion 76 that is formed integral to the holding frame 48 (or the holding frame 50) is inserted into and drawn out from in between the light projecting portion 74A and the light receiving portion 74B. Thus, by the light blocking portion 76 being inserted between the light emitting portion 74A and the light receiving portion 74B and the light amount detected by the light receiving portion 74B varying accordingly, that the light blocking portion 76 (that is, the holding frame 48 or 50) has moved to a predetermined position can be detected. By thus detecting reference positions of the holding frames 48 and 50 by means of the position detector 74 and detecting the moving amounts of the holding frames 48 and 50 by means of the position detector 72, the positions of the holding frames 48 and 50 can be determined accurately. The actuators 10 and 11 are driven and controlled based on measurement values of the position detectors 72 and 74.

Figure 9:
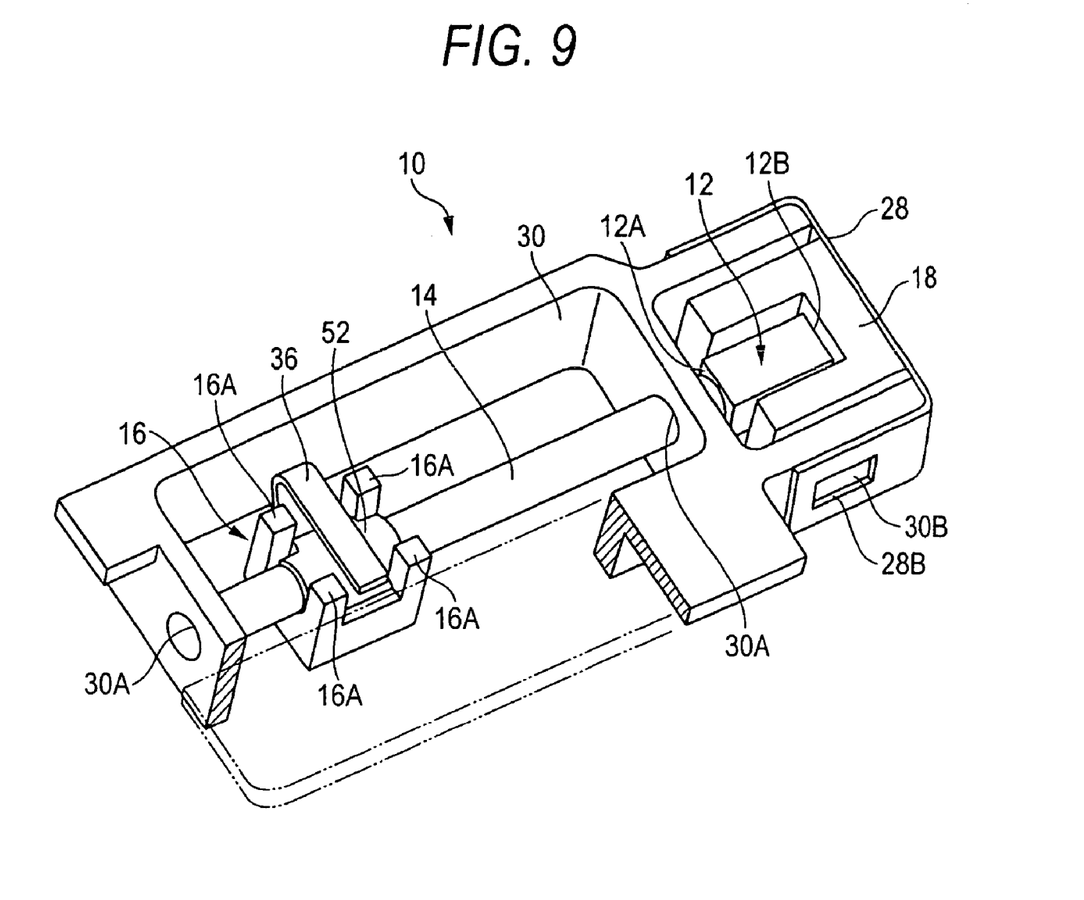
FIG. 9 is a diagram of an arrangement of the actuator according to the present invention.

FIG. 9 is a perspective view of an arrangement of the actuator 10. As shown in this figure, the actuator 10 is mainly arranged from the piezoelectric element (corresponding to being an electro-mechanical conversion element) 12, the driving shaft (corresponding to being a driving frictional member) 14, the driven member 16, and the weight member 18, and is mounted onto the fixed frame 30 by a mounting bracket 28. The fixed frame 30 is fixed to the main body 42 of the lens device 40 of FIG. 6.

The piezoelectric element 12 is layered in the optical axis P direction (hereinafter, "driving direction") of the lens device 10 and is arranged to deform (extend or contract) in the driving direction upon application of voltage. Thus, with the piezoelectric element 12, the end faces 12A and 12B in the longitudinal direction become displaced in the driving direction upon application of voltage.

Of the end faces 12A and 12B of the piezoelectric element 12, the base end of the driving shaft 14 is affixed to the one end face 12A. The driving shaft 14 is formed to a cylindrical shape and is positioned so that its central axis lies along the driving direction. The driving shaft 14 is inserted through two holes 30A formed in the fixed frame 30 and is thereby guided and supported in a manner enabling sliding along the central axis direction. As the material of the driving shaft 14, a graphite crystal composite, such as carbon graphite, in which graphite crystals are compounded firmly, is used.

The driven member 16 is engaged with the driving shaft 14. The driven member 16 is connected to the holding frame 48 of the zoom lens 44 and is supported in a manner enabling sliding along the optical axis P direction (the driving direction) along with the holding frame 48. The driven member 16 is formed to a rectangular shape, and upwardly protruding protrusions 16A are respectively provided on the four corners thereof.

Figure 10:
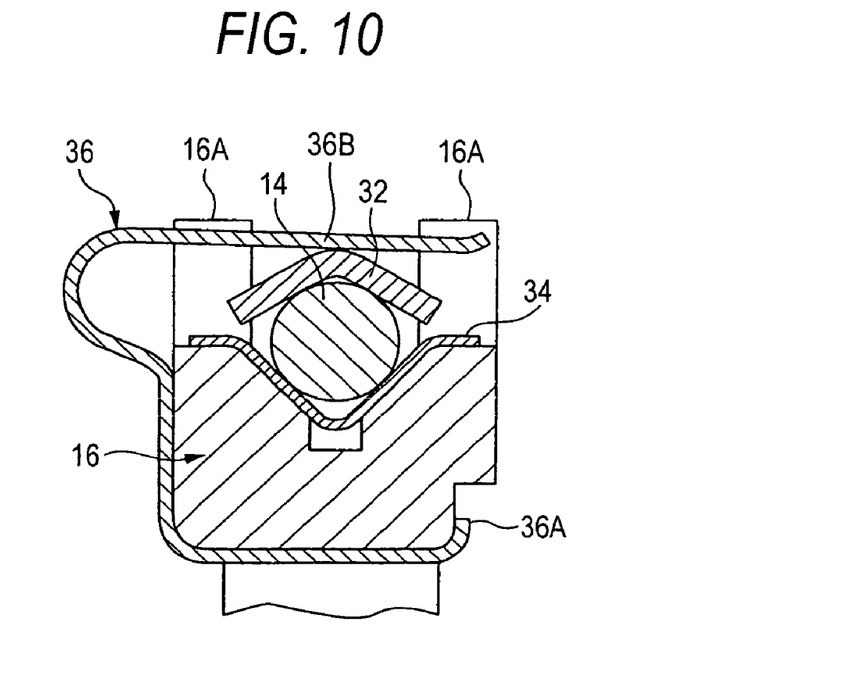
FIG. 10 is a sectional view of a connection portion of a drive shaft and a driven member.

FIG. 10 is a sectional view of the connection portion of the driven member 16 and the driving shaft 14. As shown in this figure, a first sliding member 32 and a second sliding member 34 are provided at the connection portion of the driven member 16 and the driving shaft 14. The first sliding member 32 is disposed at an upper side of the driving shaft 14, and the second sliding member 34 is disposed at a lower side of the driving shaft 14. The first sliding member 32 and the second sliding member 34 are members that are provided to obtain a stable frictional force between the driven member 16 and the driving shaft 14 and are formed, for example, from stainless steel.

The second sliding member 34 is formed to a V-shape and is fixed to the driven member 16. Meanwhile, the first sliding member 32 is formed to an inverted V-shape and is positioned in a region surrounded by the four protrusions 16A of the driven member 16. The first sliding member 32 is notched at its respective corner portions in accordance to the protrusions 16A of the driven member 16. Thus, when the first sliding member 32 is positioned in the region surrounded by the protrusions 16A, the first sliding member 32 is prevented from falling off from the driven member 16.

A pressing spring 36 is mounted onto the driven member 16. The pressing spring 36 is arranged by bending a metal plate and is mounted onto the driven member 16 by hitching a claw 36A onto a lower portion of the driven member 16. The pressing spring 36 also has a pressing portion 36B that is positioned on an upper side of the first sliding member 32 and is arranged to urge the first sliding member 32 downward by the pressing portion 36B. The driving shaft 14 is thereby put in a state of being sandwichingly pressed by the first sliding member 32 and the second sliding member 34, and the driven member 16 is frictionally engaged with the driving shaft 14 via the first sliding member 32 and the second sliding member 34. The frictional force between the driven member 16 and the driving shaft 14 is set so that when drive pulses of a gradual voltage variation is applied to the piezoelectric element 12, the frictional force is greater than the driving force, and when drive pulses of a rapid voltage variation is applied to the piezoelectric element 12, the frictional force is less than the driving force. Here, the frictional force (sliding resistance) is preferably no less than 10 gf and no more than 30 gf and more preferably no less than 15 gf and no more than 25 gf.

As shown in FIG. 8, a soft weight member 18 is fixed by adhesion onto the end face 12B of the piezoelectric element 12. The weight member 18 is formed to a square C-shape and the end face 12B of the piezoelectric element 12 is affixed to a bottom portion of an inner side thereof. That is, the weight member 18 is affixed to the end face 12B and extends along sides of the piezoelectric element 12. The extended portions of the weight member 18 are disposed in spaces between the side faces of the piezoelectric element 12 and the fixed frame 30 at the sides of the piezoelectric element 12.

By applying a load to the rear end face 12B, the weight member 18 prevents the end face 12B from becoming displaced more than the end face 12A. Thus, as the weight member 18, a member that is greater in weight than the driving shaft 14 is preferable. Also, the weight member 18 is formed of a material with a Young's modulus less than that of each of the piezoelectric element 12 and the driving shaft 14 and, for example, is formed of a material with a Young's modulus of no more than 300 MPa. For example, the weight member 18 is formed of urethane rubber or urethane resin, etc., and is manufactured by mixing a powder of tungsten or other metal into the rubber or resin to make the specific gravity high. To achieve compact size, the specific gravity of the weight member 18 is preferably made as high as possible and is set, for example, to approximately 8 to 12.

The weight member 18 is adhered onto the mounting bracket 28 at the side opposite the piezoelectric element 12. The mounting bracket 28 is formed by bending a thin metal plate to a square C-shape and openings 28B are formed at the bent portions at both ends. The mounting bracket 28 is mounted onto the fixed frame 30 by fitting protrusions 30B of the fixed frame 30 into the openings 28B. The piezoelectric element 12 is thus supported on the fixed frame 30 via the weight member 18 and the mounting bracket 28.

The piezoelectric element 12 that is supported as described above is supported in a manner in which the rear end face 12B can be displaced in the driving direction. That is, the rear end face 12B of the piezoelectric element can be displaced in the driving direction by the expansion or contraction of the soft weight member 18 or the warping of the mounting bracket 28.

For example, the voltages of the drive pulses shown in FIGS. 2A and 2B are applied to the piezoelectric element 12.

The actions of the actuator 10 arranged as described above shall now be described.

Figure 12:
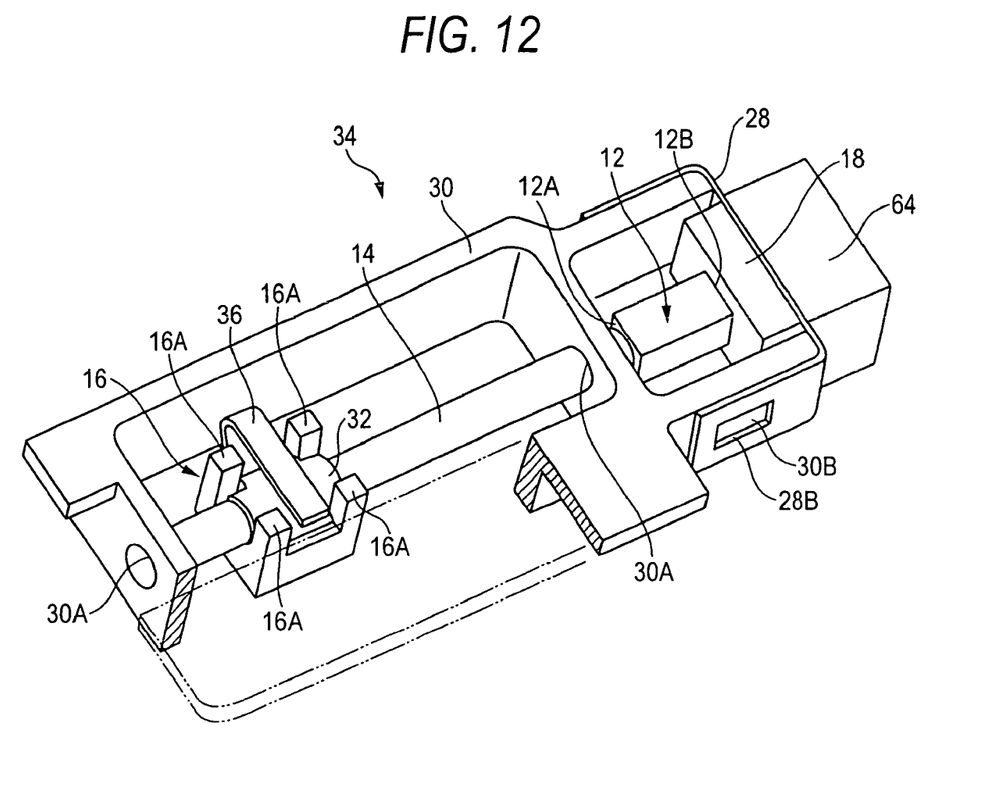
FIG. 12 is a diagram of an arrangement of an actuator of a comparative example.

Because the zoom lenses (groups) 44 and 46 are large in movement amount in comparison to a focusing lens, etc., the driving shaft 14 becomes long and the vibration of the piezoelectric element 12 is not transmitted readily to the tip of driving shaft 14. In the related art, to resolve this problem, a large weight member 64 of large weight had to be mounted as shown in FIG. 12. The related-art lens device thus required a larger weight member the longer the moving distance of the driven member 16, and the device thus became large. In particular, because the piezoelectric element 12, the driving shaft 14, and the weight member 18 are positioned along the driving direction, the device became long in the driving direction.

On the other hand, with the embodiment shown in FIG. 9, the weight member 18 is formed to a square C-shape and extends along the sides of the piezoelectric element 12. By thus extending the weight member 18 along the sides of the piezoelectric element 12, the actuator 10 can be prevented from becoming large in the driving direction when the weight member 18 is made large. That is, by using the spaces at the sides of the piezoelectric element 12, a large weight member 18 can be provided without making the actuator 10 large in the driving direction.

Figure 11:
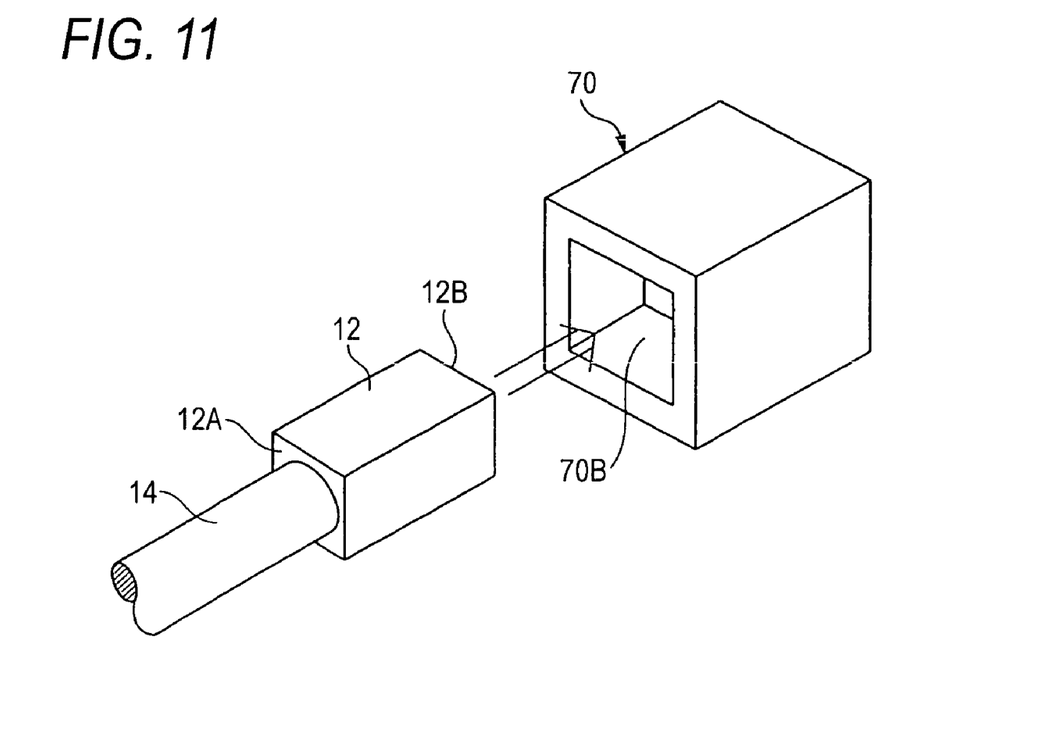
FIG. 11 is a perspective view of a weight member of another shape.

Although with the above-described embodiment, the weight member 18 is formed to a square C-shape, the shape of the weight member 18 is not restricted thereto and may be any shape that extends along the sides of the piezoelectric element 12. For example, a weight member 70, shown in FIG. 11, is formed to a rectangular parallelepiped and has a recessed groove 70B formed therein. The piezoelectric element 12 is inserted into this groove 70B and the end face 12B of the piezoelectric element 12 is adhered onto a bottom portion of the groove 70B. When the weight member 70 of such a shape is used, an even heavier weight member can be used without making the actuator 10 large in the axial direction.

Although in the above-described embodiments, the entireties of the weight members 18 and 70 are formed of the same material, the present invention is not restricted thereto. For example, of the weight member 18, a material of large elastic force may be used at a portion to the rear of the piezoelectric element 12, a material of large specific gravity may be used at the portions to the sides of the piezoelectric element 12, and these portions may be adhered together.

Also, as applications of the actuator according to the present invention, application, for example, to digital cameras, mobile phones, and other compact precision apparatuses is possible. In particular, with a mobile phone, although driving must be performed at a low voltage of no more than 3V, by using the actuator according to the present invention, driving at a high frequency of approximately 20 kHz is enabled and the holding frame 48 or 50 can be moved at a high speed of no less than 2 mm/s. Thus, even a zoom lens requiring movement of approximately 10 mm can be moved rapidly. Applications of the actuator according to the present invention are not restricted to applications of moving focusing lenses, zoom lenses, and other movable lenses, and use in applications in which a CCD is moved is also possible.

With the actuator according to the present invention, because the weight member extends along the sides of the electro-mechanical conversion element, the actuator can be prevented from becoming large in the driving direction when the weight member is made large.

The entire disclosure of each and every foreign patent application from which the benefit of foreign priority has been claimed in the present application is incorporated herein by reference, as if fully set forth.

What is claimed is:
1. An actuator comprising:
   an electro-mechanical conversion element;
   a driving frictional member mounted onto one side in an extension/contraction direction of the electro-mechanical conversion element;

a driven member frictionally engaged with the driving frictional member; and a weight member directly affixed to the other side in the extension/contraction direction of the electro-mechanical conversion element and having an extended portion extending along both sides of the electro-mechanical conversion element and ending prior to said driving frictional member wherein the weight member has an inner surface connected directly to said electro-mechanical conversion element and an outer surface parallel to said inner surface, both the inner surface and the outer surface of an end portion are connected to said extended portions at right angles forming a rectangular c-shape.

2. The actuator according to claim 1,
wherein the weight member is an elastic body containing a metal powder.

3. The actuator according to claim 2,
wherein the elastic body is urethane rubber.

4. The actuator according to claim 1,
wherein the weight member is formed to a square C-shape.

5. The actuator according to claim 1,
wherein the weight member is mounted onto the electro-mechanical conversion element by an adhesive agent.

6. The actuator according to claim 1,
wherein a holding frame of a zoom lens is mounted onto the driven member.

7. An actuator according to claim 1, further comprising a fixed frame for supporting the electromechanical conversion element via the weight member, wherein the extended portion of the weight member is disposed in space between the side face of the electromechanical conversion element and the fixed frame.

* * * * *